United States Patent [19]
Guetersloh

[11] 3,829,850
[45] Aug. 13, 1974

[54] PROXIMITY DETECTOR

[75] Inventor: John W. Guetersloh, Hamburg, N.Y.

[73] Assignee: Tyco Laboratories, Inc., Waltham, Mass.

[22] Filed: Dec. 17, 1971

[21] Appl. No.: 209,333

[52] U.S. Cl............ 340/258 C, 324/61 R, 317/153
[51] Int. Cl. ........................................ G08b 13/00
[58] Field of Search ........ 340/258 C, 244 C, 228 R, 340/258 R; 328/116, 147; 324/60 C, 61 R, 71 R; 317/123, 153

[56] References Cited
UNITED STATES PATENTS

| | | | |
|---|---|---|---|
| 2,962,641 | 11/1960 | Maltby et al. | 340/244 C |
| 3,197,658 | 7/1965 | Byrnes et al. | 340/258 C |
| 3,230,519 | 1/1966 | Metz et al. | 340/258 C |
| 3,365,623 | 1/1968 | Stacey | 328/147 X |
| 3,445,835 | 5/1969 | Fudaley | 340/258 C |
| 3,493,954 | 2/1970 | Bartlett et al. | 340/258 C |
| 3,576,565 | 4/1971 | Schulz | 340/258 C |

Primary Examiner—John W. Caldwell
Assistant Examiner—William M. Wannisky
Attorney, Agent, or Firm—LeBlanc & Shur

[57] ABSTRACT

A capacitive proximity detector protects against injury, damage or unauthorized entry into a protected area. It comprises an unbalanced capacitive bridge including an antenna or sensor which produces an output proportional to the capacitance of the antenna to ground. A change in capacitance is detected and the resulting signal is applied to a pair of "windows" having maximum and minimum values which, if exceeded, operate a pair of relays and produce a suitable visual indication. Many fail-safe and other safety features are provided in the detector.

22 Claims, 7 Drawing Figures

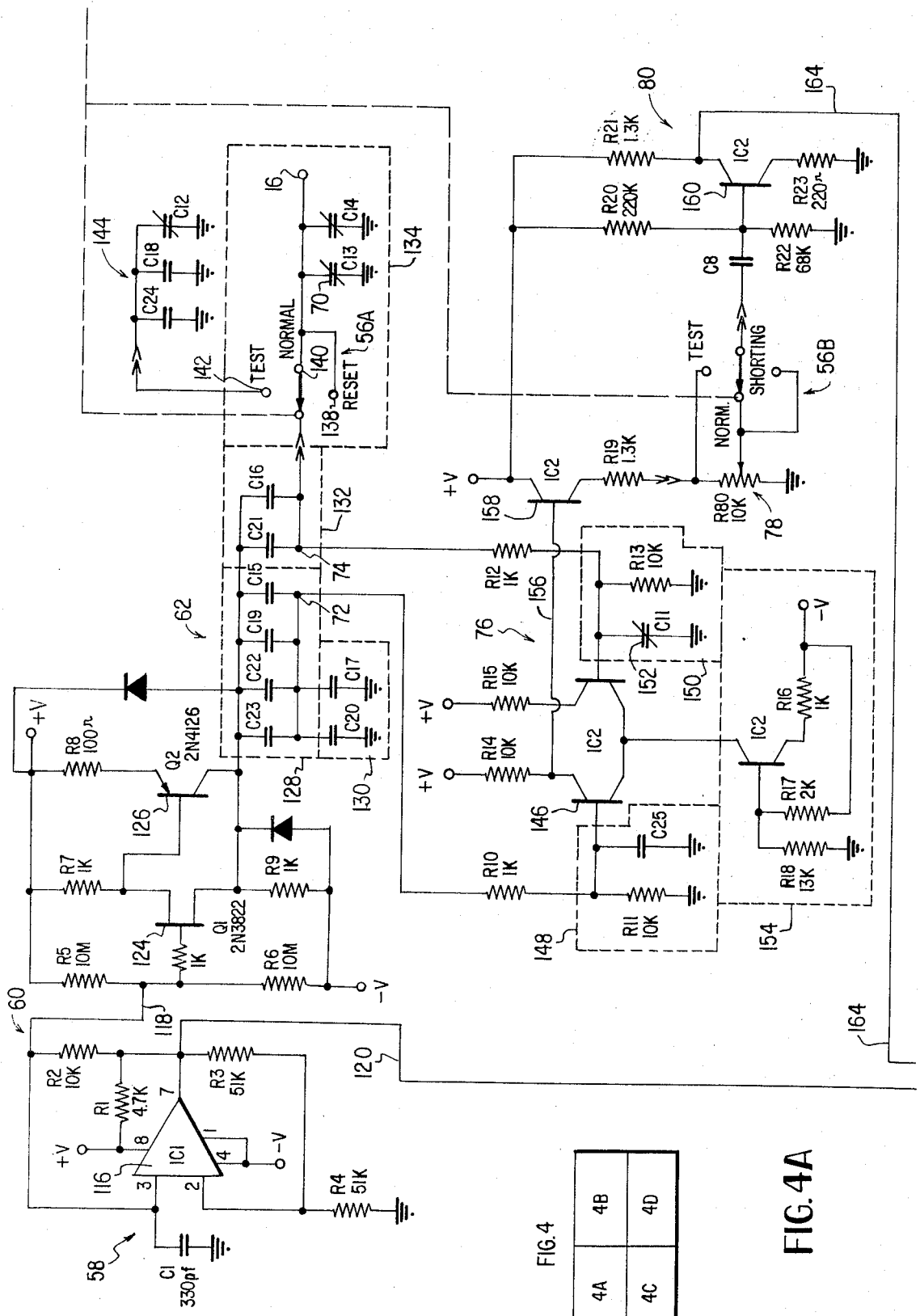

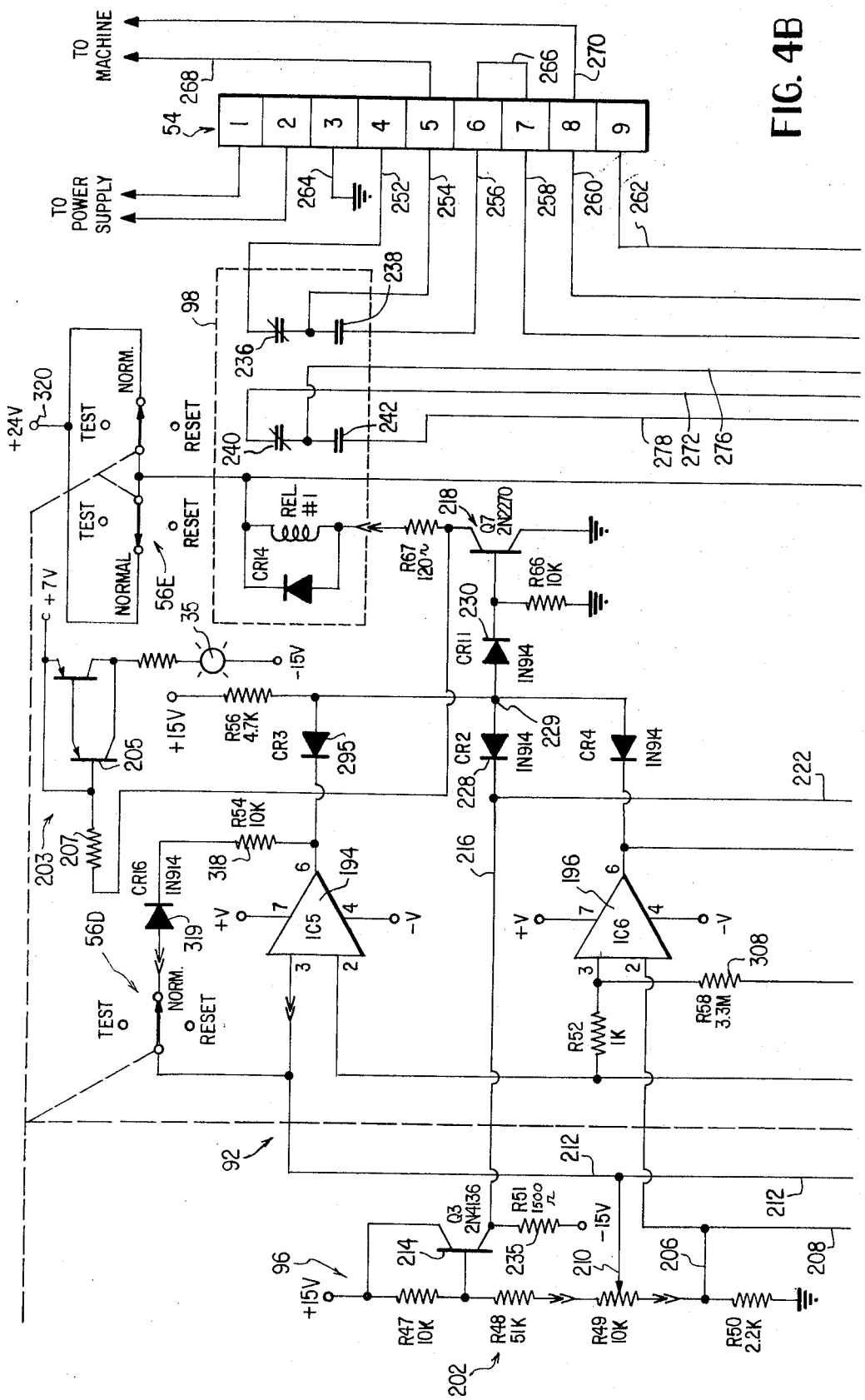

PROXIMITY DETECTOR

This invention relates to an electrical proximity detecting device and, more particularly, to a solid state electrical protector unit which senses a change in capacity near the protector to open a circuit, to close a circuit, sound an alarm, or otherwise take appropriate action. The device is particularly designed for guarding against human injury during the operation of machinery, such as presses, molding machines, and the like. However, it may be used in all types of proximity applications to prevent either human or equipment injury and likewise may be used to indicate unauthorized entry into restricted or hazardous areas.

Proximity detectors have been used for some time to detect the entrance of an object into a protected area. Perhaps devices of this type are best known for use in conjunction with presses, whereby the insertion of the operator's hand into an area where it may be injured by the press is immediately sensed and press operation promptly stopped. While devices of this type may take a number of forms, one class of these devices to which the present invention is directed utilizes an electrical conductor of aluminum or the like, sometimes referred to as an antenna, located in the protected area. The antenna is energized from a low power radio frequency source such that a change in capacitance or a change in the electrical field in the area of the antenna is immediately sensed and indicated by the protective device.

In order to prevent imparting a false sense of security, it is essential that a protective unit of this type operate with maximum reliability. To this end the novel protector of the present invention is provided with several fail-safe features and with redundant circuit components so that should any part of the system for some reason operate improperly, this improper operation is immediately indicated and appropriate machine shutdown action taken. At the same time, increased reliability is obtained without loss of sensitivity by incorporating the detector antenna in a completely capacitive bridge so that the detector senses only changes in capacitance and responds negligibly to other impedance changes to ground. The output of the unbalanced capacitive bridge is applied to a balance detector including an adjustable phase shift circuit so that the bridge may be accurately nulled.

In the present invention, an oscillator operating in the low radio range of approximately 110 KHz energizes a capacitive bridge through a buffer amplifier so that the radio frequency source is effectively isolated from the bridge. Forming one bridge arm is the electrical conductor or antenna located in the area to be protected. The antenna is connected in the bridge circuit by a coaxial cable and, in accordance with its size, shape and surrounding objects, forms a predetermined capacitance with ground. Any change in capacitance in the area of the antenna changes the bridge output which is supplied through a balance detector, buffer and amplifier to a demodulator in the form of a synchronous detector. The detector, in conjunction with a low pass filter, produces a DC signal having a magnitude proportional to the AC output of the bridge. This is applied through a difference amplifier to a meter and also passes through a pair of window discriminators having predetermined maximums and minimums. Should the DC output either exceed or fall below the respective maximum and minimum values of the window, an appropriate output signal is generated, such as may be used to turn off the equipment.

Also forming an important part of the device of the present invention are a pair of relays, each having mechanical interconnections between control relay and monitor relay contacts, so that the condition of the control relay is monitored at all times. Other features improving the reliability of the protector of this invention include a transistor for detecting changes in reference voltages, an RC time constant circuit for detecting variations in relay operation, and a feedback circuit for each window for enhancing the relay operation when the DC level fall below the lower cutoff value of the windows. Incorporated in the protector is a test circuit by means of which the protector may be checked to insure proper operation. All active elements are solid state devices and these are incorporated in a locked security cabinet so that access to the operating components of the circuit may be had only by authorized personnel.

It is therefore one object of the present invention to provide an improved proximity detector.

Another object of the present invention is to provide a proximity detector for protecting against human and machine entry, as well as indicating unauthorized entrance or approach to a restricted area.

Another object of the present invention is to provide an electrical safety device of simplified and inexpensive construction and one which incorporates all solid state active components.

Another object of the present invention is to provide a proximity detector with increased sensitivity, reliability, and stability.

Another object of the present invention is to provide a safety protector incorporating fail-safe features which insure shutdown of dangerous or hazardous operating equipment should some malfunction in the protector occur.

Another object of the present invention is to provide a proximity detector incorporating a pair of redundant windows defining minimum and maximum levels which if exceeded automatically turn off the operating equipment and provide a suitable indication of the malfunction.

These and further objects and advantages of the invention will be more apparent upon reference to the following specification, claims, and appended drawings, wherein:

Figure 1:
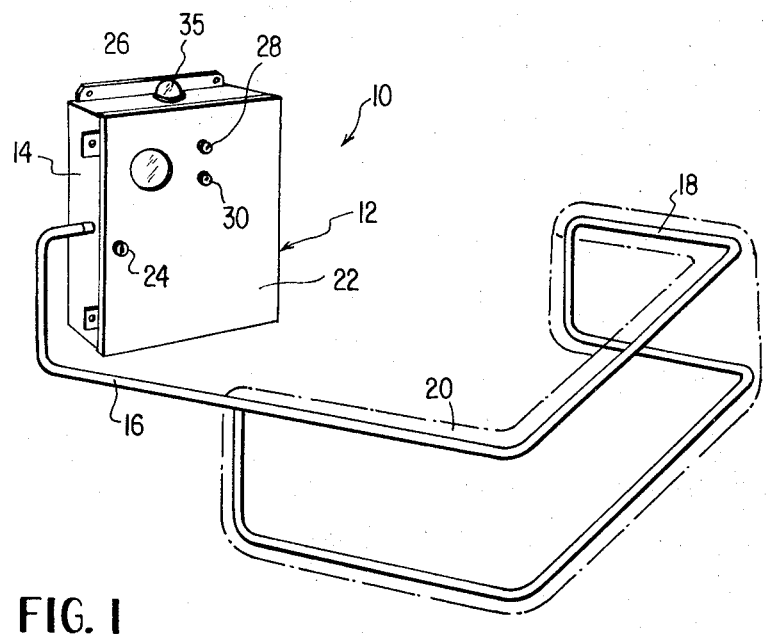
FIG. 1 is a perspective view of the protector and associated antenna as it might be constructed for protecting a press machine with the security cabinet closed.

Referring to the drawings, the novel proximity protector or detector constructed in accordance with the present invention is generally illustrated at 10 in FIG. 1 as comprising a control unit 12 mounted in a security cabinet 14 and connected by a coaxial cable 16 to an antenna 18. A typical area protected by the antenna 18 is indicated by the stippling at 20. Security cabinet 14 houses all of the active components of the protector and includes a door 22 provided with a key lock 24 so that access to the interior of the cabinet can only be had by authorized personnel. The door is provided with a large window 26 for viewing a meter located in the cabinet, with a pair of small windows 28 and 30 for viewing a pair of indicator lights, as more fully described below, and a beehive light 35, also more fully described below. Control unit 12 is connected to the antenna or sensor 18 by a coaxial cable which may typically come in lengths of 4, 8, and 12 feet, although the length of cable 16 is not critical. By way of example only, sensor or antenna 18 may be formed of thin-wall conduit (EMT) having a ¾ inch inner diameter and a 1 inch outer diameter.

Figure 2:
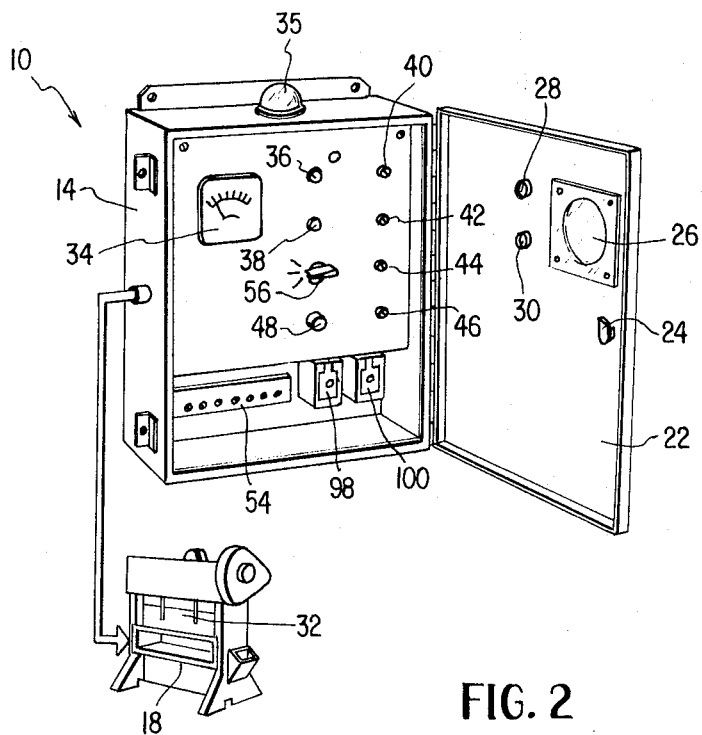
FIG. 2 is a similar perspective view with the security cabinet open and the press illustrated diagrammatically.

FIG. 2 illustrates the protector 10 as used to protect an area adjacent a machine, illustrated at 32. While antenna 18 is illustrated as of closed loop configuration, it is understood that it may take a variety of sizes and shapes not necessarily of closed configuration, and the only requirement is that it be made of a rigid material sufficiently conductive to form a predetermined capacitance to ground. Antenna 18 is preferably mounted on suitable insulators to electrically insulate it from ground and from the surrounding structure. The thin-walled conduit having a ¾ inch inner diameter placed 4 inches from a ground plane will typically have a capacitance of approximately 6 to 8 picofarads per foot of conduit. The standard coaxial cable conventionally has a capacitance of approximately 10 picofarads per foot. The only limitation is that the total capacitance of the sensor or antenna and cable should not exceed approximately 325 picofarads.

FIG. 2 illustrates the door 22 of the sensor unit open to expose the indicators, connectors, and other components of the circuit. These include a milliammeter 34, an upper cutoff lamp 36, and a lower cutoff lamp 38. Meter 34 is viewed through the window 26 and lamps 36 and 38 are viewable through the cover 22 by way of respective windows 28 and 30. Also illustrated in FIG. 2 is a coarse balance adjustment screw 40, a fine balance adjustment screw 42, a sensitivity adjustment screw 44, and an upper cutoff adjustment screw 46. Also visible in FIG. 2 is a fuse holder adapted to hold a ½ amp slow-blow fuse for the power supply, as illustrated at 48, a pair of relays 98 and 100, and an output connector bank 54. Also mounted on the panel in the control cabinet is a three-position mode switch 56 which is spring-loaded to return to its center NORMAL position when released. This switch is movable between TEST, NORMAL, and RESET positions and is spring-loaded to return to the central NORMAL position after any operation. When a machine shutdown occurs due to failure in the antenna circuitry, the system can be restored to the operative condition by rotating the switch to the RESET position and allowing it to return to the NORMAL position after corrective action has been taken. Turning to the TEST position will be described below.

Figure 3:
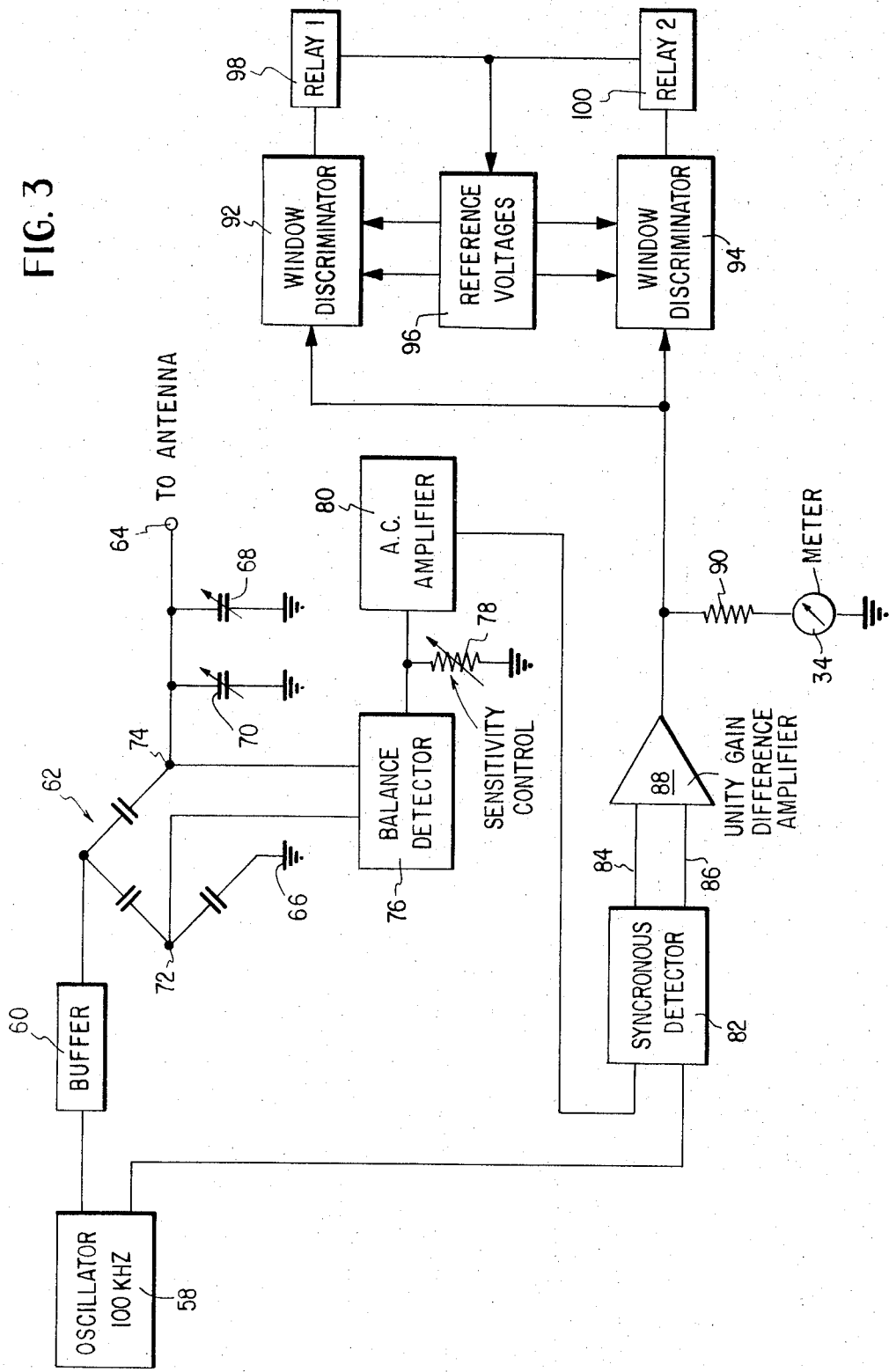
FIG. 3 is an overall block diagram of the proximity detector of the present invention.

FIG. 3 is a block diagram of the overall proximity detector of the present invention. It comprises an oscillator 58 which, by way of example only, may operate at a frequency of approximately 110 KHz connected through a buffer 60 to a capacitance bridge 62. Antenna 18 of FIGS. 1 and 2 is connected through coaxial cable 16 to terminal 64 in FIG. 3 so that the antenna is connected in one arm of the bridge 62 from terminal 64 to ground, illustrated at 66. The capacitance of this arm may be varied through adjustment of variable capacitors illustrated at 68 and 70. An AC signal representative of the bridge unbalance is developed across bridge terminals 72 and 74 and this is applied to the two input terminals of a balance detector 76. The balance detector performs the important function of providing an AC signal proportional to the degree of bridge unbalance. The output of the balance detector is adjusted by a variable resistor 78 which is adjusted through rotation of the sensitivity adjustment screw 44 of FIG. 2, and t is output is applied through an AC amplifier 80 to one input of a demodulator in the form of a synchronous detector 82. The second input of detector 82 is connected directly to a squarewave output from oscillator 58. Two DC signals, each corresponding to the bridge unbalance but acting opposite to each other, are developed on the output leads 84 and 86 of the synchronous detector 82 and these DC signals are applied to the two inputs of a unity gain difference amplifier 88. The DC output of the difference amplifier is connected to milliammeter 34 through current limiting resistor 90 and the DC signal is also supplied to the inputs of two identical windows 92 and 94. Each window is provided with maximum and minimum limits so that should the signal from unity gain amplifier 88 rise above the maximum window limit or fall below the minimum window light, the press or other machine controlled by the protector is immediately stopped. The limit values for the windows are derived from a reference voltage source 96 and the windows are in turn coupled to a pair of control relays 98 and 100 so that the relays are controlled by the output signals from the windows 92 and 94. Relays 98 and 100 may be independently operated or may be wired together to form a single control in a manner more fully described below.

Figure 4C:
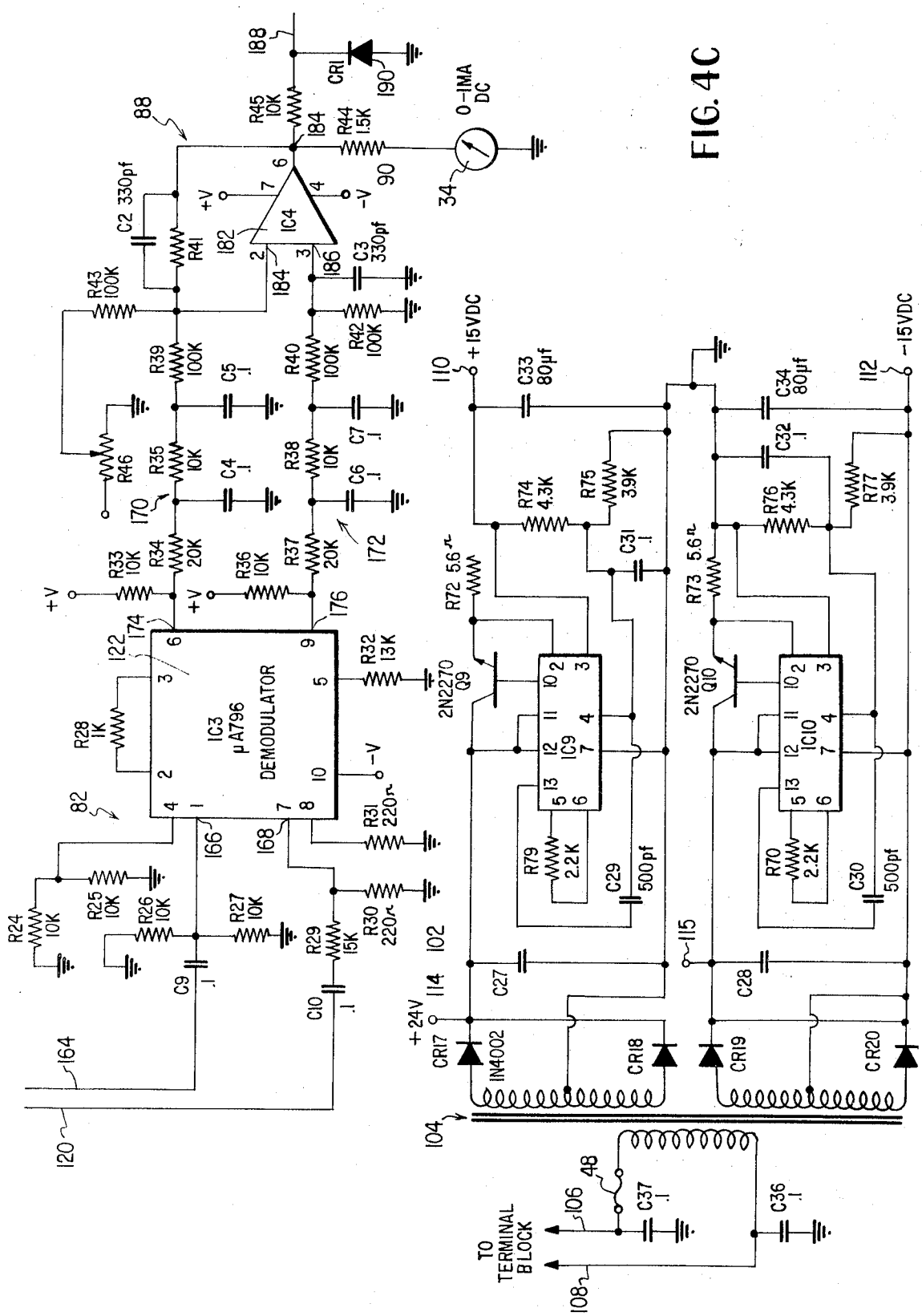
FIG. 4 is a composite of FIGS. 4A through 4D which taken together constitute a detailed circuit diagram of the proximity detector.
Figure 4D:
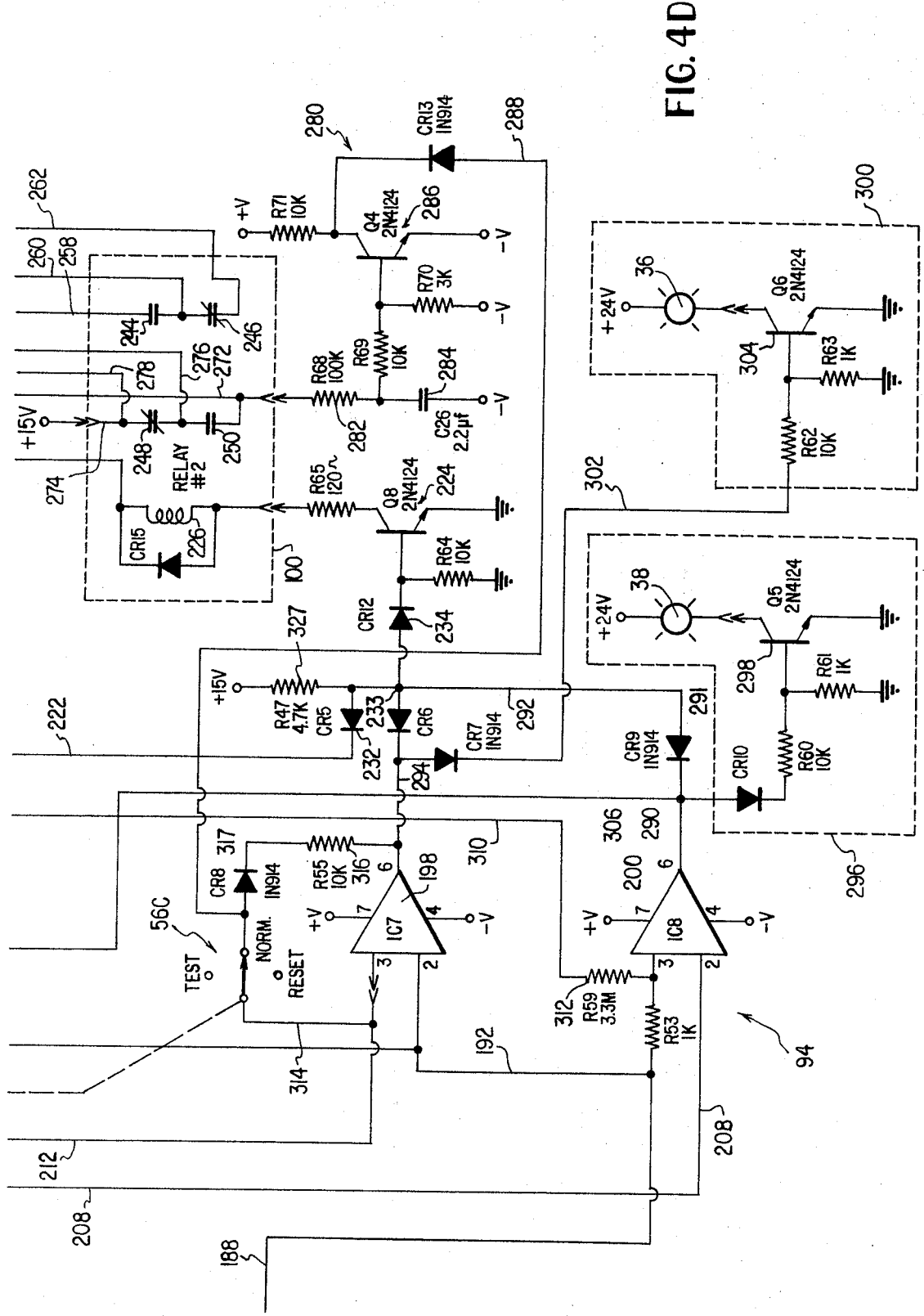

FIGS. 4A through 4D constitute a detailed circuit diagram of the proximity detector or protector of the present invention when arranged as illustrated in FIG. 4. It comprises a conventional power supply, generally indicated at 102, including a transformer 104 adapted to be energized from a conventional 110 volt, 60 Hz AC outlet by way of leads 106 and 108. The power supply circuit 102 develops at +15 volt DC regulated voltage at terminal 110, a −15 volt DC regulated voltage at terminal 112, a +24 volt unregulated voltage at terminal 114, and a +7 volt unregulated voltage at terminal 115. Since the power supply circuit 102 is of conventional construction, it will not be described in detail.

Oscillator 58 in FIG. 4A comprises an integrated circuit 116 connected to form a free-running multivibrator providing an output on lead 118 of triangular wave shape and a second output on lead 120 of the same frequency but having a substantially square wave shape. Lead 120 is connected to one inut terminal of the demodulator, i.e., synchronous detector, 82 which includes integrated circuit 122. The triangular wave signals are passed through buffer 60 which includes a junction FET 124, labeled $Q_1$, and a junction transistor 126, labeled $Q_2$. From the buffer, the AC signals pass to the capacitive bridge 62, which comprises the three capacitive arms 128, 130, and 132. The fourth arm of the bridge is formed by the coaxial cable 16 and the antenna 18 to which it is connected. This fourth arm is generally indicated at 134 and also includes the pair of variable capacitors 68 and 70. These capacitors are varied by the coarse and fine adjustment screws 40 and 42 in FIG. 2. The fourth arm 134 of the bridge is connected to the remainder of the bridge circuit through a portion of switch 56, as indicated at 56A. This switch is manually movable between the RESET, NORMAL, and TEST contacts 138, 140, and 142, and, as previously described, is spring-biased into contact with NORMAL contact 140. When manually moved into contact with contact 142, a group of TEST capacitors 144 are placed in the bridge circuit and these are used for checking the remainder of the circuit.

The output terminals 72 and 74 of the bridge are connected to the two inputs of balance detector 76 including a pair of integrated circuit transistors, generally indicated at 146. The balance detector includes a pair of phase shifting circuits 148 and 150, the latter including a variable capacitor 152. Balance detector 76 also includes a constant current source 154.

The output on lead 156 from the balance detector is applied to a buffer including integrated circuit transistor 158 and through a second section 56B of switch 56 to an AC amplifier 80 including an integrated circuit transistor 160. Connected to the emitter of buffer transistor 158 is the sensitivity adjustment potentiometer 78 which is varied by adjustment of screw 44 in FIG. 2. The AC signal on lead 164 connected to the output of AC amplifier 80 is applied to one input terminal 166 of the demodulator or synchronous detector 82. The other input 168 of the synchronous detector is connected by lead 120 to the squarewave output from oscillator 58 as previously described.

A pair of low pass filter sections 170 and 172 are connected to the two outputs 174 and 176 of the synchronous detector and operate with the synchronous detector in a well known manner to produce DC signals at the respective inputs 84 and 86 of the unity gain difference amplifier 88 including integrated circuit operational amplifier 182. The inputs at 84 and 86 to the respective terminals of the difference amplifier are DC signals, each corresponding to the bridge unbalance but acting opposite to each other so that the output appearing at output terminal 184 of the amplifier is a DC signal equal in magnitude to the difference between the DC signals at input terminals 84 and 86. The magnitude of this output signal is indicated by milliammeter 34 connected across the amplifier output and which, by way of example only, may have a display range of from 0 to 1 milliamp. The input terminal 84 of amplifier 182 is also connected through a potentiometer to the +15 volt DC power supply so that the potentiometer 186 forms a bias or offset control for difference amplifier 88, the purpose of which is to adjust the DC signal level on output terminal 184 to a level appropriate for the degree of unbalance in the bridge circuit 62.

An output lead 188 is connected through a resistor to output terminal 184 and connected across this lead is a rectifier diode 190. Rectifier diode 190 is poled so that the DC potential on output lead 188 can never go negative more than approximately ½ volt DC.

The DC voltage level on output lead 188 is applied by this lead and a second lead 192 to a pair of window discriminators 92 and 94. The two windows are of identical construction; the first window 92 is formed by a pair of integrated circuit difference amplifiers 194 and 196. Amplifier 194 determines the maximum voltage level which will be passed by window 92 and amplifier 196 determines the minimum voltage level which will be passed by the window 92. These maximum and minimum voltage levels are referred to as the upper and lower cutoff values, respectively. Similarly, window 94 is formed by a pair of difference amplifiers 198 and 200. Amplifier 198 determines the upper cutoff value and amplifier 200 determines the lower cutoff value. These maximum and minimum limits are determined by the reference voltage source 96 which comprises a series of resistors 202 connected between the positive 15 volt terminal of the power supply and ground. The lower cutoff voltage level, which is fixed and typically may be set through initial adjustment to a level of 0.5 volts DC, it taken off from the series resistors at the tap 204 and is applied by leads 206 and 208 to the No. 2 input terminals of difference amplifiers 196 and 200. The upper cutoff voltage level is taken from the tap of potentiometer 210 and is applied by lead 212 to the No. 3 input terminals of amplifiers 194 and 198. This upper cutoff level is variable by rotating screw 46 in FIG 2 and may typically be adjusted in the range of from 0.5 to approximately 2.8 volts DC.

The two windows are of identical construction and are set to have identical maximum and minimum voltage limit levels. This redundancy in the circuit is provided as one of the many safety features in the circuit to insure proper operation of the protector device and to make certain that a malfunction in the circuit will be indicted and will act to shutdown the press or other machine being protected. As an additional safety feature, the circuit of FIG. 4B incorporates in the reference voltage circuit 96 a protective junction transistor 214. During normal operation, this transistor is turned on and is conducting. However, should a break occur in the series resistance network and particularly should a break occur between taps 204 and 210 where it might not otherwise be detected, the resulting high potential or increased potential at the base of transistor 214 will turn that transistor off. The collector of transistor 214 is connected by lead 216 through diode 228 to point 229. Point 229 is in turn connected through diode 230 with the base of transistor switch 218 connected in series with the coil 220 of relay 98. It is also connected by lead 222 through diode 232 to point 233. Point 233 is in turn connected through diode 234 with the base of transistor switch 224 in series with the coil 226 of relay 100. During normal operation, transistors 218 and 223 are turned on by the high potential at their bases and current flows through the relay coils to energize the coils. When transistor 214 switches off, the lower potential appearing at the collector of this transistor allows current to flow from +15 volt DC through resistor 231, diode 228 and resistor 235 to −15 volt DC. Resistors 231 and 235 are such that point 229 will then have a negative potential and transistor switch 218 will turn off. In a similar fashion, point 233 will have a negative potential when transistor 214 switches off because of the current flowing through resistors 237 and 235. This will cause transistor switch 224 to turn off also. Under this condition, the series circuit through the relay coils is broken and the coils are deenergized to stop the equipment being protected.

Relay 98 comprises a first pair of contacts, referred to as the machine control contacts, which consist of normally closed contacts 236 and normally open contacts 238. The normally open and normally closed conditions for the contacts illustrated in the drawings will prevail when the respective relay coils are unenergized. In addition, relay 98 comprises a second pair of contacts, referred to as the monitor contacts, again consisting of a normally closed pair of contacts 240 and a pair of normally open contacts 242. The machine control contacts 236 and 238 are mechanically ganged internally of the relay with the monitor contacts 240 and 242 so that monitor contacts mechanically follow the condition of machine control contacts. Relay 100 is of identical construction and comprises normally open and normally closed machine control contact sets 244 and 246 and the corresponding monitor contacts 248 and 250. In the same manner, contacts 248 and 250 mechanically follow the condition of contacts 244 and 246. Contacts 236 and 238 of relay 98 are connected to the terminal block 54 by leads 252, 254, and 256. Similarly, machine control contacts 244 and 246 are connected to the terminal block 54 by leads 258, 260, and 262. The relay leads are connected to respective terminals numbered 4–9 of the terminal block. Terminal 3 of the block is connected to ground, as indicated at 246, while terminals 1 and 2 of the terminal block connect to the power supply leads 106 and 108, previously described. Terminals 1 and 2 are adapted to be externally connected to a conventional 60 Hz, 117 volt power supply outlet. Relays 98 and 100 may be operated independently or may be connected in series as illustrated by connecting an external jumper 266 across terminals 6 and 7 and connecting terminals 5 and 8 of the terminal block in series in the energizing circuit of the machine press or other electrical device to be controlled by way of leads 268 and 270. The relays are of conventional construction and, by way of example only, may be of the type commercially available from Potter & Brumfield model KRP11DG.

The purpose of the monitor contacts in the relays 98 and 100 is to make certain that the two relays work together, i.e., that their machine control contacts open and close at the same time. For this purpose, the normally closed contacts 240 and 248 of the monitor sets are connected together and to the positive side of the power supply by leads 272 and 274. The midpoints between the normally open and normally closed monitor sets are interconnected by lead 276 and the normally open contacts are connected together by lead 278 and to a relay safety circuit, generally indicated at 280. This circuit comprises a charging resistor 282, a charging capacitor 284, and a feedback transistor 286. As long as both relays 98 and 100 are in the same position or condition, no circuit is completed to the charging capacitor 284 from power supply lead 274 through the monitor contacts. However, if the relays 98 and 100 assume different positions or conditions, a circuit can be traced through the monitor contacts of both relays from the positive power supply terminal 274 to the negative side of the power supply through charging capacitor 284. If this difference in condition between the relay contacts persists for a sufficient length of time, capacitor 284 charges up through resistor 282, turning on transistor 286 which, in turn, supplies a feedback signal over lead 288 which acts to deenergize the relays and the machine being protected in a manner more fully described below.

As previously indicated, difference amplifier 200 determines the minimum cutoff for the lower window 94. That is, it establishes the minimum potential on output lead 188 which will maintain the relay coils energized. If the output voltage level on lead 188 applied to input terminal No. 3 of amplifier 200 is above the reference level of +0.5 volts at input terminal No. 2 of this amplifier, then the voltage level at the amplifier output 290 is approximately +15 volts. With approximately +15 volts at output 290, there will be no current flowing through resistor 237 and diode 291 and the potential at point 233 remains at +15 volts DC. If the voltage level at input terminal No. 3 of the amplifier falls below the +0.5 volt reference level, then the output at 290 goes negative, i.e., falls to approximately −15 volts. With output 290 at −15 volts, current will flow through resistor 237 and diode 291 and the potential at point 233 will also drop to approximately −15 volts. With point 233 at a minus potential, current will not be able to flow through diode 234 to the base of switching transistor 224 and switching transistor 224 will turn off and deenergize relay 100. The operation of low cutoff amplifier 196 of the upper window 92 is the same since the inputs of the two amplifiers are interconnected by leads 192 and 206.

Output lead 290 from amplifier 200 is also connected by a lead 306 and a feedback resistor 308 to the signal terminal No. 3 of lower cutoff amplifier 196 for the upper window 92. This connection is provided to insure that the relays work together at the lower cutoff value. That is, when the lower cutoff is exceeded, i.e., when the potential on lead 188 falls below the reference level of +0.5 volts, lead 290 goes from +15 volts to −15 volts. The minus potential is applied through the feedback resistor 308 to terminal No. 3 of amplifier 196, causing this terminal to go slightly negative so that its output also switches from positive to negative. A similar feedback crosscoupling from this amplifier back to amplifier 200 is provided by lead 310 and feedback resistor 312 so that if the output of amplifier 196 when low cutoff is exceeded is the first to go negative, this is applied through feedback resistor 312 to amplifier 200, causing its output to also go rapidly negative.

In the upper cutoff amplifier, such as the amplifiers 198 and 194, the reference and signal input terminals are reversed. That is, the upper reference voltage level variable between +0.5 and +2.8 volts DC is applied over lead 212 to the No. 3 terminals of the upper cutoff amplifiers 198 and 194. Considering amplifier 198, for example, if the voltage level from lead 188 applied by way of lead 192 to terminal No. 2 of amplifier 198 is below the reference level at terminal No. 3, then the output from this amplifier on lead 294 is approximately +15 volts, maintaining the relay energized in a manner similar to the method with which the relay is maintained energized when output 290 is at +15 volts. If the output level on lead 188 exceeds the reference level, then otput lead 294 goes negative to approximately − 15 volts and the relays are deenergized, again in a manner similar to the method with which the relay is deenergized when the output at 290 is at −15 volts.

Also connected to output 294, through feedback resistor 316, diode 317 and bank 56C of switch 56, is terminal No. 3 of amplifier 198 and, through lead 212, terminal No. 3 of amplifier 194. When output 294 of amplifier 198 is at +15 volts, diode 317 is biased off and the voltage level of terminals No. 3 of both amplifiers 198 and 194 is unaffected by the feedback circuit. When output 294 goes to −15 volts, terminals No. 3 of amplifiers 198 and 194 will go rather heavily negative as diode 317 is biased on. In a similar manner, the feedback circuit, consisting of resistor 318, diode 319 and switch bank 56D of switch 56, will also cause the voltage on lead 212 and terminals No. 3 of amplifiers 194 and 198 to go negative as the voltage on output 295 of amplifier 194 goes to −15 volts. The operation of amplifier 194 of the upper window is essentially the same as the operation of amplifier 198. Since diode 190, as previously shown, will not allow the DC voltage on leads 188 and 192 to go negative more than approximately ½ volt, once a −15 volt level on the outputs of amplifiers 194 and 198 have brought the signals on terminals No. 3 of amplifiers 194 and 198 heavily negative, it is impossible to bring the voltage levels on terminals No. 2 of amplifiers 194 and 198 negative enough to switch the outputs 294 and 295 back to +15 volts. The feedback signal on lead 288 from RC safety circuit 280 operates in a somewhat similar fashion. During normal operation, transistor 286 is turned off and lead 288 is at a relatively high potential. When capacitor 284 charges, transistor 286 becomes conductive and the potential on lead 288 goes negative. This negative potential is fed back over lead 288 and another lead 314, through switch bank 56C to the reference terminal No. 3 of upper cutoff amplifier 198, thus switching the outputs 294 and 295 to −15 volts. These feedback circuits through the switch banks insure that once the relays have been deenergized by the upper cutoff amplifiers 194 and 198, they cannot be reenergized until switch 56 is moved both to the RESET position and returned to the NORMAL position. That is, the relays cannot be reenergized until the feedback circuits are broken by movement of switch 56 to the RESET position and then reclosure of the switch.

In all cases, a positive output potential of approximately +15 volts on the output leads of all four window amplifiers 194, 196, 198, and 200 is required to maintain the relays energized. If the output from any one of these amplifiers goes negative, both relays are deenergized by turning off the switching transistors 218 and 224. The output 290 of low limit amplifier 200 is connected to a light driver circuit, generally indicated at 296, comprising a switching transistor 298 and low limit cutoff lamp 38. The positive output on lead 290 indicating normal operation is applied to the base of transistor 298 maintaining this transistor conducting and the light 38 energized. When the output on lead 290 goes negative, transistor 298 is switched off and the light 38 goes out. A similar upper cutoff light driver circuit 300 is connected by lead 302 to the output 294 from upper cutoff amplifier 198. This circuit includes switching transistor 304 and upper cutoff light or lamp 36. As long as the output from the amplifier on lead 294 is positive, transistor 304 is conducting and light 36 is lit. When the output from amplifier 198 goes negative, transistor 304 is cut off and light 36 is extinguished.

A final bank 56E of the switch is provided to disconnect the relays 98 and 100 from the positive power supply terminal 320 for the relays when switch 56 is in either the TEST or the RESET position. Connected to the collector of transistor 218 by lead 201 is a light driver circuit, generally indicated at 203, which drives beehive light 35 shown in FIGS. 1 and 2. The purpose of light 35 is to indicate when the switching transistors 218 and 224 have been turned on and have energized the relay coils 226 and 220. When the voltage applied to the base of transistor 205 through lead 201 and resistor 207 is close to ground potential, as it is when transistor 218 is turned on, the transistor pair in the circuit indicated at 203 will be on and current will flow from the +7 volt supply taken from point 115 of the power supply to the −15 volt supply, turning light 35 on. When transistor switch 218 is turned off deenergizing relay 98, the voltage on lead 201 will rise to +24 volts. This positive voltage is reflected through lead 201 and resistor 207 to the transistor pair in the circuit shown at 203, turning these transistors off and thus turning the light 35 off.

In operation, the antenna 18 should be securely mounted on the machine and checked to insure proper clearance throughout the machine cycle. Whenever possible, this should be done without powering the machine. The control cabinet is securely mounted in its permanent location and 117 volt, 60 Hz AC power is connected to the terminals so marked and a secure and positive connection provided between the ground terminal and the frame of the machine. A separate conductor of No. 12 copper, preferably stranded and terminated with solder lugs or crimp-on terminals, can be used. The relay contact terminals are connected to the machine control circuit. The coaxial cable is then installed between the antenna and the control cabinet and its connectors securely tightened.

When making adjustments, the machine must be in the inoperative condition. During normal operation, both the upper cutoff and lower cutoff indicator lamps are illuminated and machine shutdown occurs if either of the indicator lamps is extinguished. The lower cutoff indicator lamp is extinguished by an increase in sensor circuit capacitance produced when the operator's hand or any foreign object intrudes into the protected region. The upper cutoff indicator is extinguished by a decrease in sensor circuit capacitance caused by loss of (or faulty connection to) a portion of the antenna assembly or by a failure of the cable or connectors between the antenna and the control unit. The contacts of relays 98 and 100 are brought out independently to permit either a circuit closure or a circuit opening to stop the machine. If the machine circuitry requires that the control circuit be open to stop the machine, both open contacts should be wired in series with the machine control circuit. Conversely, if the machine circuitry requires that the control circuit be closed to stop the machine, both closed contacts should be connected in parallel with the machine control circuit connected across them. The upper cutoff light is extinguished if the antenna cable is damaged or disconnected or if the antenna becomes displaced or damaged. A machine shutdown due to any of these causes requires that after the defect is remedied, the cabinet door must be unlocked and opened and the manual RESET of switch 56 be performed before the system is again operative. The lower cutoff light is extinguished when any foreign object intrudes into the protected area, also causing machine shutdown. However, this circuit is self-restoring and the indicator lamp will again illuminate when the cause of the shutdown is removed, restoring the operative condition. Machine operation and the sensing system operation cannot be restored by holding the switch in the RESET position and because of this safety feature, the system cannot be intentionally defeated. Rotating the switch 56 to the TEST position disconnects the antenna from the system and substitutes a preset capacitance. The meter indication is used to verify that the antenna capacitance and the TEST capacitance both produce the desired condition in the system.

It should be noted that in the present invention the bridge is during normal operation deliberately out of balance so that an output is produced and a potential of between the minimum cutoff of +0.5 volts and the maximum cutoff variable up to +2.8 volts DC appears on lead 188. Thus, should power supply potential fail, the relays are automatically deenergized.

It is apparent from the above that the present invention provides an improved safety device or proximity sensor or detector for sensing the presence of a foreign object, such as an operator's hand, tool, or the like. Important features of the invention include a completely capacitive bridge with a variable phase shift network for better nulling and plurality of redundancy and safety features in the circuit so that should anything go wrong, either externally or internally of the circuit, the control relays are automatically placed in the deenergized state. Several redundant or duplicated features are provided in the circuit to insure dependable and reliable operation. The device is incorporated in a rugged, oil-tight, solid state electronic control configuration designed for heavy industrial use. There are no moving parts which need continual maintenance or inspection to insure continued safety and reliability. External power failure, accidental breakage or disconnection of the antenna, relay or internal malfunction causes the unit to shut down in a safe position and the dual output relays are constantly monitored internally for proper operation. All controls for the unit are contained inside the locked control cabinet so that only authorized personnel are able to adjust the controls. When the press machine or other machine being protected is operating, the protector device must also be in operation or it will shut down the machine. Removing or disconnecting the antenna does not defeat the control.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States letters Patent is:

1. A protector device comprising a capacitive balancing circuit, means for coupling an antenna located adjacent an area to be protected electrically into said balancing circuit, said antenna having a capacitive reactance which causes said balancing circuit to be normally unbalanced, means coupled to said balancing circuit for exciting it with alternating electrical energy, a demodulator coupled to said balancing circuit for producing a DC output indicative of unbalance in said balancing circuit, a pair of electrical windows having maximum and minimum limits coupled to the output of said demodulator, and a pair of relays coupled to said windows for actuation when the output of said demodulator is greater than the maximum limit or less than the minimum limit of either window.

2. Apparatus according to claim 1 wherein said balancing circuit comprises a bridge.

3. Apparatus according to claim 2 wherein said bridge comprises only capacitive elements.

4. Apparatus according to claim 3 wherein said bridge includes a variable capacitor.

5. Apparatus according to claim 4 including a variable balance detector coupling the output of said bridge to said demodulator.

6. Apparatus according to claim 1 wherein said demodulator comprises a synchronous detector, and means for coupling a squarewave output from said exciting means to said synchronous detector.

7. A protective device comprising a capacitive bridge, means for coupling an antenna located at an area to be protected electrically into an arm of said bridge, said antenna having a capacitive reactance which causes said bridge to be normally unbalanced, an oscillator, a buffer coupling an output of said oscillator across said bridge, a balance detector coupled to the output of said bridge, a synchronous detector having a first input coupled to said balance detector and a second input coupled to said oscillator, a difference amplifier coupled to said synchronous detector, a control relay, and an electrical window having maximum and minimum limits coupling the output of said difference amplifier to said relay.

8. Apparatus according to claim 7 including a meter coupler to the output of said difference amplifier.

9. Apparatus according to claim 7 including a rectifier diode coupling the output of said difference amplifier to a reference potential whereby said difference amplifier output can not fall below said reference potential.

10. Apparatus according to claim 7 comprising a pair of control relays coupled to the output of said difference amplifier, each of said relays having mechanically interconnected control and monitor contacts, a time delay circuit coupled to said monitor contacts, and means for feeding a disabling signal from said time delay circuit to said electrical window when said relays do not work substantially in unison.

11. A protective device comprising a capacitive bridge, means for coupling an antenna located at an area to be protected electrically into an arm of said bridge, an oscillator, a buffer coupling an output of said oscillator across said bridge, a balance detector coupled to the output of said bridge, a synchronous detector having a first input coupled to said balance detector and a second input coupled to said oscillator, a difference amplifier coupled to said synchronous detector, a pair of control relays coupled to the output of said difference amplifier, an electrical window having maximum and minimum limits coupling the output of said difference amplifier to said relays, each of said relays having mechanically interconnected control and monitor contacts, a time delay circuit coupled to said monitor contacts, means for feeding a disabling signal from said time delay circuit to said electrical window when said relays do not work substantially in unison, said electrical window comprising a pair of voltage comparators, said time delay circuit including an RC circuit, and means for feeding a disabling signal from said RC circuit to an input of one of said voltage comparators.

12. Apparatus according to claim 11 including means cross-coupling the inputs and outputs of said voltage comparators.

13. A protective device comprising a capacitive bridge, means for coupling an antenna defining an area to be protected into an arm of said bridge, said antenna having a capacitive reactance which causes said bridge to be normally unbalanced, a radio frequency oscillator, a buffer coupling the output of said oscillator across said bridge, a demodulator coupled to the output of said bridge for producing a DC signal indicative of bridge unbalance, a pair of electrical windows having maximum and minimum limits coupled to said demodulator, each window comprising a pair of voltage comparators, a pair of control relays, a solid state switch coupled to the coils of each of said relays, and means coupling said switches to the outputs of all of said voltage comparators.

14. Apparatus according to claim 13 including an antenna, and a coaxial cable coupling said antenna into said bridge.

15. Apparatus according to claim 14 wherein said antenna comprises a thin-walled conduit.

16. Apparatus according to claim 13 including a DC reference voltage source, and means coupling reference voltages from said source to the reference input of each of said voltage comparators.

17. Apparatus according to claim 16 wherein the reference voltage coupled to the maximum limit comparators of said windows is variable.

18. Apparatus according to claim 17 including a solid state switch coupling said reference voltage source to the coils of said relays whereby a break in the circuit of said reference voltage source operates through said switch to actuate said relays.

19. Apparatus according to claim 13 including at least one variable test capacitor, and a test switch for coupling said test capacitor into said bridge.

20. Apparatus according to claim 13 including a reset switch coupled between the input and output of the maximum limit comparators of said windows whereby said reset switch must be opened and reclosed to reset said protective device when the maximum limit of said windows has been exceeded.

21. A protective device comprising a capacitive bridge, an antenna located at an area to be protected, means for coupling said antenna electrically into an arm of said bridge, said antenna having a capacitive reactance, said bridge with said antenna being normally unbalanced, an oscillator, a buffer coupling an output of said oscillator across said bridge, a balance detector coupled to the output of said bridge, a synchronous detector having a first input coupled to said balance detector and a second input coupled to said oscillator, a difference amplifier coupled to said synchronous detector, a control relay, and an electrical window having maximum and minimum limits coupling the output of said difference amplifier to said relay.

22. A protective device comprising a capacitive bridge, an antenna located at an area to be protected having a capacitive reactance, means for coupling said antenna into an arm of said bridge, said bridge with said antenna normally being unbalanced, a radio frequency oscillator, a buffer coupling the output of said oscillator across said bridge, a demodulator coupled to the output of said bridge for producing a DC signal indicative of bridge unbalance, a pair of electrical windows having maximum and minimum limits coupled to said demodulator, each window comprising a pair of voltage comparators, a pair of control relays, a solid state switch coupled to the coils of each of said relays, and means coupling said switches to the outputs of all of said voltage comparators.

* * * * *

UNITED STATES PATENT OFFICE
CERTIFICATE OF CORRECTION

Patent No. 3,829,850                     Dated August 13, 1974

Inventor(s)  John W. Guetersloh

It is certified that error appears in the above-identified patent and that said Letters Patent are hereby corrected as shown below:

Col. 2, line 14, "fall" should read --falls--.
Col. 4, line 12, "t is" should read --this--; line 28, "window light" should read --window limit--; line 57, "inut" should read --input--.
Col. 5, line 10, "contact" first occurrence should read --engagement--.
Col. 6, line 14, "it" should read --is--; line 48, "223" should read --224--.
Col. 11, line 17, "plurality" should read --a plurality--.
Col. 12, line 28, claim 8, "coupler" should read --coupled--.

Signed and sealed this 3rd day of December 1974.

(SEAL)
Attest:

McCOY M. GIBSON JR.
Attesting Officer

C. MARSHALL DANN
Commissioner of Patents